United States Patent
Brown

(10) Patent No.: US 9,090,162 B2
(45) Date of Patent: Jul. 28, 2015

(54) BATTERY PACK CONDENSATION PREVENTION

(71) Applicants: Robert Bosch GmbH, Stuttgart (DE); Samsung SDI Co., Ltd., Yongin-si, Gyeonggi-do (KR)

(72) Inventor: Carlton D. Brown, Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 13/674,416

(22) Filed: Nov. 12, 2012

(65) Prior Publication Data

US 2014/0046524 A1    Feb. 13, 2014

Related U.S. Application Data

(60) Provisional application No. 61/681,205, filed on Aug. 9, 2012.

(51) Int. Cl.
| | |
|---|---|
| *B60L 3/00* | (2006.01) |
| *H01M 10/633* | (2014.01) |
| *H01M 10/48* | (2006.01) |
| *H01M 10/6567* | (2014.01) |
| *H01M 10/625* | (2014.01) |

(52) U.S. Cl.
CPC ............... *B60L 3/00* (2013.01); *H01M 10/48* (2013.01); *H01M 10/486* (2013.01); *H01M 10/5022* (2013.01); *H01M 10/5016* (2013.01); *H01M 10/5075* (2013.01)

(58) Field of Classification Search
CPC ... B60L 3/00; H01M 10/5022; H01M 10/486; H01M 10/48; H01M 10/5075; H01M 10/5016
USPC .............................................. 701/22
See application file for complete search history.

(56) References Cited

U.S. PATENT DOCUMENTS

| | | | | |
|---|---|---|---|---|
| 2,106,101 | A * | 1/1938 | Labus et al. ................. | 236/44 C |
| 3,037,387 | A * | 6/1962 | Friedman et al. ............... | 374/20 |
| 3,526,658 | A * | 9/1970 | Bryant, Jr. .................... | 562/485 |
| 2009/0020346 | A1* | 1/2009 | Krauer et al. ................ | 180/65.2 |
| 2009/0021221 | A1* | 1/2009 | Krauer et al. ................. | 320/153 |
| 2011/0256432 | A1* | 10/2011 | TenHouten et al. ............ | 429/50 |
| 2011/0267004 | A1* | 11/2011 | Krauer et al. ................. | 320/109 |

FOREIGN PATENT DOCUMENTS

| | | |
|---|---|---|
| JP | 2008204992 A | 9/2008 |
| WO | 2011111949 A2 | 9/2011 |
| WO | 2012082116 A1 | 6/2012 |

OTHER PUBLICATIONS

Machine Translation of JP 2008-204992.*

(Continued)

*Primary Examiner* — Mary Cheung
*Assistant Examiner* — Frederick Brushaber
(74) *Attorney, Agent, or Firm* — Maginot Moore & Beck LLP

(57) ABSTRACT

A battery control system for an electric vehicle including a battery pack includes a dew point calculation module that receives at least a first signal indicative of humidity within the battery pack and a second signal indicative of temperature within the battery pack, and that calculates a dew point within the battery pack based on the humidity and the temperature. A coolant system control module receives the dew point and a requested coolant temperature, sets a desired coolant temperature based on the dew point and the requested coolant temperature, and selectively operates a coolant system of the battery pack based on the desired coolant temperature.

12 Claims, 3 Drawing Sheets

(56) References Cited

OTHER PUBLICATIONS

International Search Report and Written Opinion corresponding to PCT Application No. PCT/US2013/053572, mailed Nov. 7, 2013 (12 pages).

English Translation of Chinese Application No. CN102803006A, Automatically Translated by the Intellectual Property Publishing House of SIPO, dated Oct. 23, 2013 (CN102803006A is related to WO2011111949A2 cited above) (33 pages).

* cited by examiner

BATTERY PACK CONDENSATION PREVENTION

CROSS-REFERENCE TO RELATED APPLICATIONS

This application claims the benefit of U.S. Provisional Application No. 61/681,205, filed on Aug. 9, 2012. The disclosure of the above application is incorporated herein by reference in its entirety.

FIELD

The present disclosure relates to systems and methods for preventing condensation within a battery pack of an electric vehicle, a hybrid-electric vehicle, and/or a plug-in hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEV), electric vehicles (EV), heavy duty vehicles (HDV) and vehicles with 42-volt electrical systems. Exemplary stationary applications include backup power for telecommunications systems, uninterruptible power supplies (UPS), and distributed power generation applications.

Examples of the types of batteries that are used include nickel metal hydride (NiMH) batteries, lead-acid batteries, lithium batteries, lithium-ion batteries, and other types of batteries. A battery system may include a plurality of battery subpacks that are connected in series and/or in parallel. The battery subpacks may include a plurality of batteries that are connected in parallel and/or in series.

SUMMARY

A battery control system for an electric vehicle including a battery pack includes a dew point calculation module that receives at least a first signal indicative of humidity within the battery pack and a second signal indicative of temperature within the battery pack, and that calculates a dew point within the battery pack based on the humidity and the temperature. A coolant system control module receives the dew point and a requested coolant temperature, sets a desired coolant temperature based on the dew point and the requested coolant temperature, and selectively operates a coolant system of the battery pack based on the desired coolant temperature.

A method of operating a battery control system for an electric vehicle including a battery pack includes receiving at least a first signal indicative of humidity within the battery pack and a second signal indicative of temperature within the battery pack, calculating a dew point within the battery pack based on the humidity and the temperature, setting a desired coolant temperature based on the dew point and a requested coolant temperature, and selectively operating a coolant system of the battery pack based on the desired coolant temperature.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Moisture within a battery (i.e., a battery pack or system that includes a plurality of batteries or subpacks) of an electric vehicle may affect performance of the battery. Accordingly, it is desirable to prevent moisture (e.g., moisture caused by condensation when water vapor condenses to liquid water) from accumulating within the battery. A battery pack condensation prevention system according to the present disclosure includes, for example, a humidity sensor arranged within or proximate to the battery to measure relative humidity within the battery. A battery control module determines a dew point of air within the battery based on the measured humidity and an air temperature. For example, the humidity sensor may have an integrated temperature sensor, and/or a standalone temperature sensor may be arranged within the battery. Or, one or both of humidity and air temperature may be estimated or determined using a model instead of using dedicated sensors. The battery control module uses the determined dew point to adjust a coolant temperature to maintain a battery coolant temperature above the dew point to prevent condensation.

Figure 1:
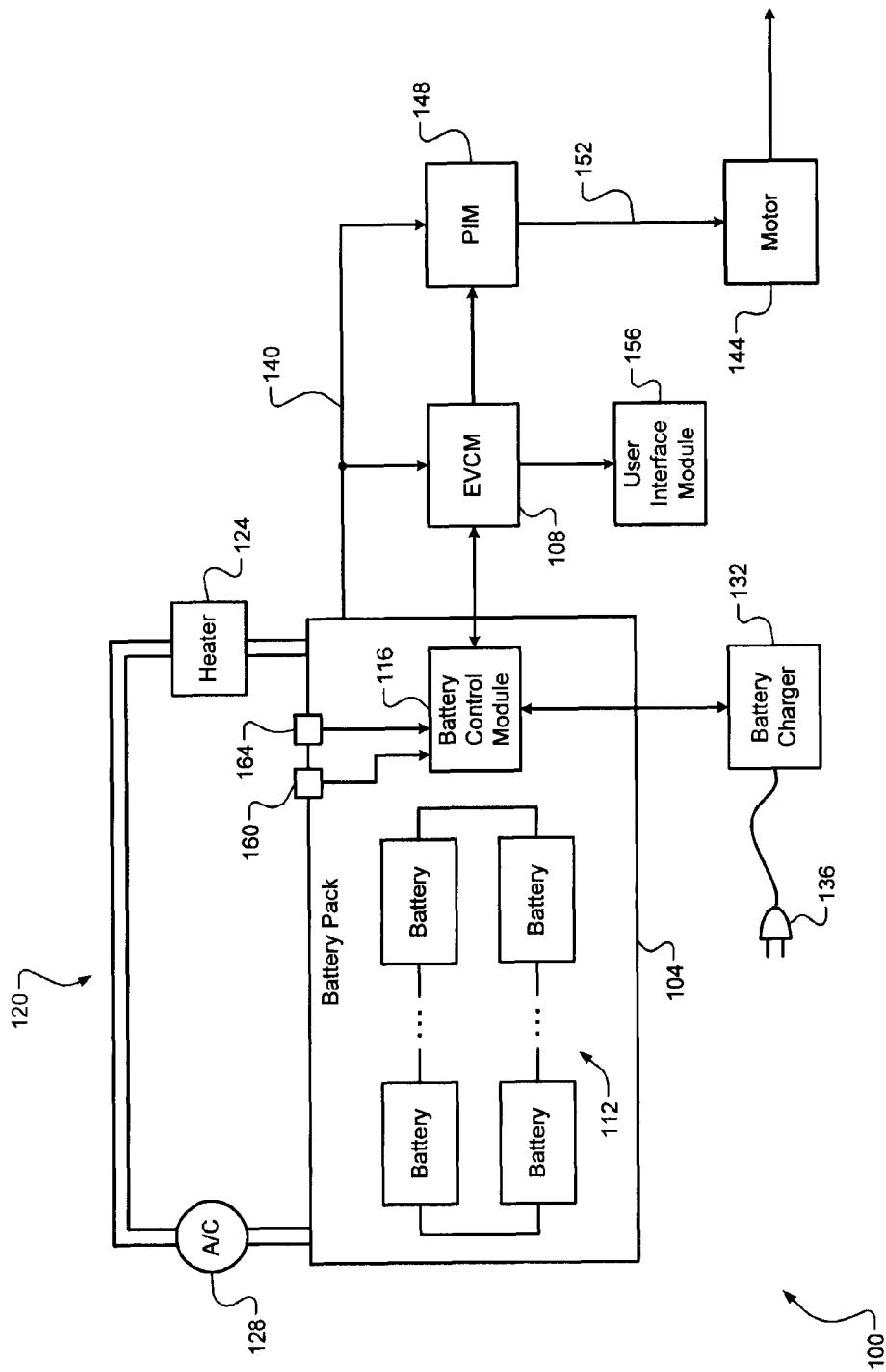
FIG. 1 is a functional block diagram of an electric vehicle according to the principles of the present disclosure.

Referring now to FIG. 1, an electric vehicle 100 includes a battery pack 104 and an electric vehicle control module (EVCM) 108. The battery pack 104 includes a plurality of batteries 112 and a battery control module 116. The battery control module 116 controls various functions of the battery pack 104 and monitors and collects various characteristics of the battery pack 104. For example, the battery control module 116 monitors characteristics including, but not limited to, voltage, current, and temperature associated with the battery pack 104. The battery control module 116 may determine performance variables of the battery pack 104 based on the characteristics. For example only, the battery control module 116 may estimate a state of charge (SOC) of the battery pack 104 based on the voltage, current, and temperature of the battery pack 104.

The battery control module 116 may initiate heating and/or cooling of the battery pack 104 based on the temperature. For example, a coolant system 120 may provide liquid coolant that flows through the battery pack 104 to heat and cool the battery pack 104. The coolant system 120 may include a heater 124 that heats the coolant when the temperature of the battery pack 104 is less than a low temperature threshold, and an air conditioner/compressor 128 that cools the coolant when the temperature of the battery pack 104 is greater than a high temperature threshold. Alternatively, instead of a compressor, the coolant system 120 may include any other coolant device suitable to chill the coolant, such as a thermoelectric cooler.

The battery control module 116 may communicate with a battery charger 132 (e.g., a battery charger of an electric or plug-in hybrid vehicle). The battery charger 132 charges the battery pack 104 and may include a user interface (not shown) for providing visual indications (e.g., via a display) of the condition of the battery pack 104 (e.g., the SOC of the battery pack 104). The battery charger 132 includes a plug 136 that interfaces with a power source (not shown) to provide charging power to the battery pack 104 via the battery charger 132.

The EVCM 108 communicates with the battery pack 104 and the battery control module 116 to control various functions of the vehicle 100. For example, the EVCM 108 receives voltage 140 from the battery pack 104. Conversely, the EVCM 108 receives information from the battery control module 116 related to, for example only, the monitored characteristics of the battery pack 104 and functions of the battery control module 116, the coolant system 120, and the battery charger 132.

The EVCM 108 controls a motor 144 of the vehicle 100 via a power inverter module (PIM) 148. The PIM 148 converts direct current (DC) voltage (e.g., the voltage 140) to alternating current (AC) voltage 152 and provides the AC voltage 152 to the motor 144. The motor 144 provides rotational force to drive wheels (not shown) of the vehicle 100. Alternatively, the motor 144 may be implemented as a DC motor, and the PIM 148 may be replaced by a motor controller that provides a DC voltage to the motor 144.

A humidity sensor 160 is arranged within the battery pack 104. The humidity sensor 160 determines a relative humidity of the air within the battery pack 104 and provides an indication of the relative humidity to the battery control module 116. For example only, the humidity sensor 160 provides an analog voltage signal proportional to the relative humidity and/or provides a digital signal indicative of the relative humidity. The humidity sensor 160 may also function as a temperature sensor to provide an indication of the temperature of the air within the battery pack 104 to the battery control module 116. Or, a separate temperature sensor 164 may be arranged within the battery pack 104.

The battery control module 116 calculates a dew point of the air within the battery pack 104 based on the humidity and the temperature of the air within the battery pack 104. The battery control module 116 communicates with the coolant system 120 to maintain the temperature above the dew point to prevent condensation within the battery pack 104. For example, the battery control module 116 may control the coolant system 120 to maintain the temperature above the dew point even if the temperature is greater than the high temperature threshold. For example only, when the temperature of the battery pack 104 is greater than the high temperature threshold, the battery control module 116 may not activate the air conditioner/compressor 128 to cool the coolant, and/or may activate the air conditioner/compressor 128 to decrease the air temperature to a predetermined offset greater than the dew point. Or, the battery control module 116 may activate the heater 124 to heat the coolant if the temperature of the battery pack 104 is less than the dew point.

Accordingly, the battery control module 116 controls the coolant system 120 based on both the temperature of the battery pack 104 and the dew point of the air within the battery pack 104 (and/or the dew point adjusted by a predetermined offset) corresponds to a lower limit of the controlled temperature of the coolant. Alternatively, the EVCM 108 may be configured to perform any of the functions described as being performed by the battery control module 116, including, but not limited to, calculating the dew point and/or controlling the heater 124 and the air conditioner/compressor 128.

Figure 2:
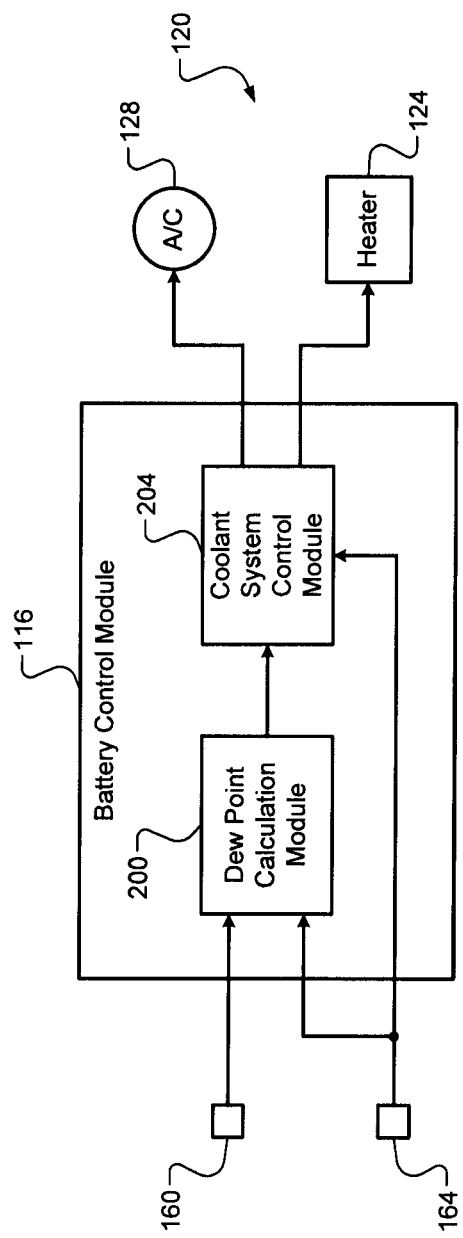
FIG. 2 is a functional block diagram of a battery control module according to the principles of the present disclosure.

Referring now to FIG. 2, the battery control module 116 includes a dew point calculation module 200 and a coolant system control module 204. The dew point calculation module 200 calculates a dew point (i.e., a dew point of the air within the battery pack 104) and outputs an indication of the dew point to the coolant system control module 204. For example, the dew point calculation module 200 communicates with (for example only, receives a signal from and/or takes a reading of) the humidity sensor 160 and the temperature sensor 164 and calculates the dew point based on the humidity and the temperature within the battery pack 104.

The coolant system control module 204 receives the dew point and the temperature and controls the coolant system 120 (e.g., selectively activates the air conditioner/compressor 128 and the heater 124) based on the dew point and the temperature. For example, the coolant system control module 204 may implement a thermal management system that requests a particular coolant temperature based on the temperature within the battery pack 104 and one or more other variables. For example only, the one or more other variables include, but are not limited to, other temperatures (e.g., ambient temperature or other measured temperatures within the electric vehicle 100), measured characteristics of the battery pack 104 (e.g., voltage, current, state of charge, etc.), other vehicle performance or status characteristics, and/or high and low temperature thresholds. Generally, the coolant system control module 204 may control the coolant system according to the coolant temperature requested by the thermal management system.

The coolant system control module 204 according to the present disclosure further adjusts the requested coolant temperature according to the dew point. For example, if the requested coolant temperature is greater than or equal to the dew point plus a predetermined offset, then the coolant system control module 204 controls the coolant system to maintain the coolant temperature according to the coolant temperature requested by the thermal management system. In other words, because the requested coolant temperature is already greater than or equal to the dew point plus the predetermined offset, additional adjustments to the requested coolant temperature to prevent condensation are not performed. For example only, the predetermined offset corresponds to a percent error associated with the humidity sensor 160 (e.g., an accuracy of the humidity sensor 160). Accordingly, the predetermined offset provides an additional buffer between the coolant temperature and the dew point.

Conversely, if the requested coolant temperature is less than the dew point plus the predetermined offset, then the coolant system control module 204 instead controls the coolant system to maintain the coolant temperature according to the dew point plus the predetermined offset. In other words, the coolant system control module 204 replaces the coolant temperature requested by the thermal management system with the dew point plus the predetermined offset. The coolant system control module 204 selectively activates the air conditioner/compressor 128 and the heater 124 to maintain the coolant temperature according to the dew point plus the predetermined offset.

Figure 3:
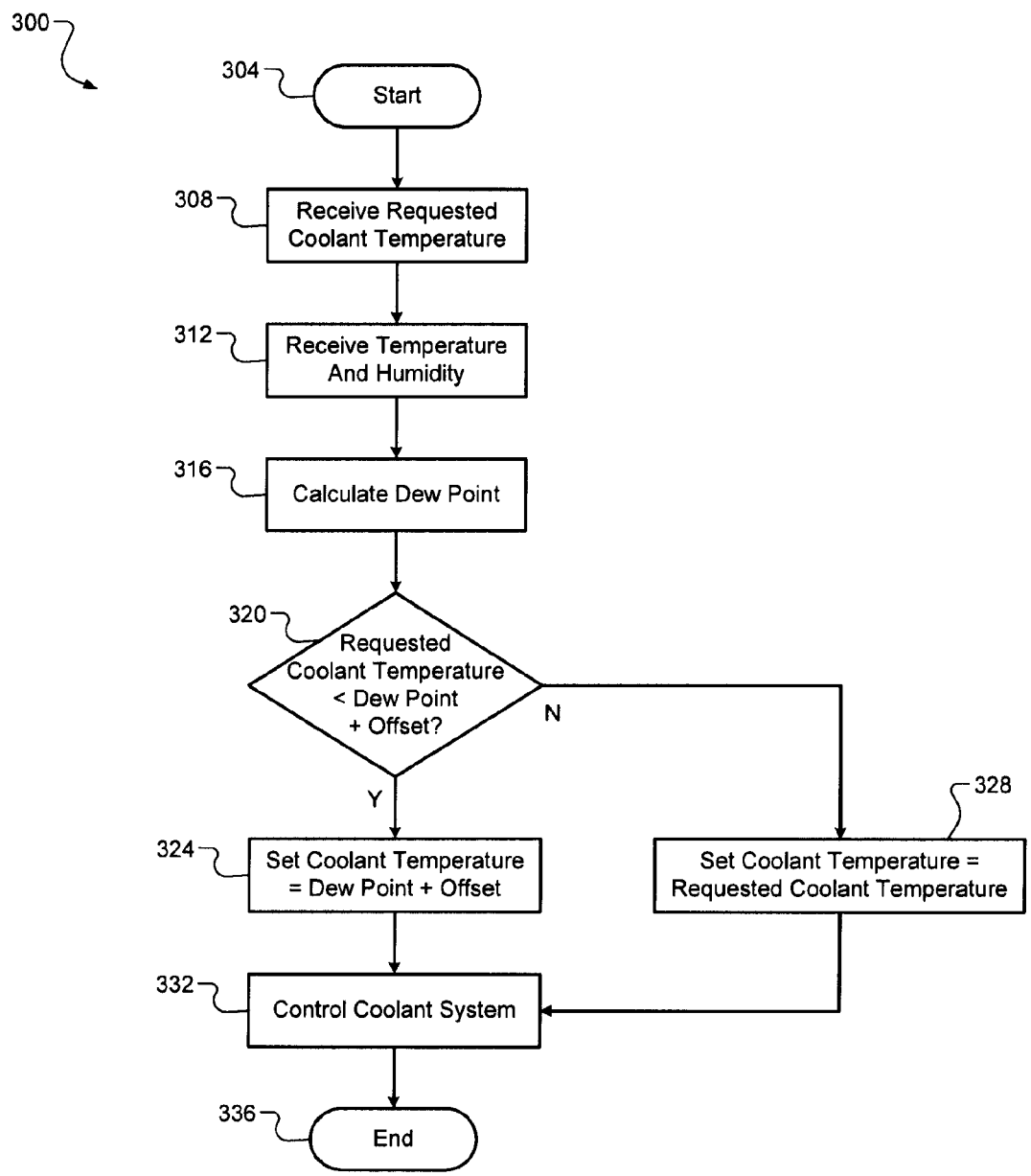
FIG. 3 illustrates a battery pack condensation prevention method according to the principles of the present disclosure.

Referring now to FIG. 3, a battery pack condensation prevention method 300 begins at 304. At 308, the method 300 receives a requested coolant temperature from, for example only, a thermal management system of an electric vehicle. At 312, the method 300 receives a temperature and a humidity of air within a battery pack of the electric vehicle. At 316, the method 300 calculates a dew point of the air within the battery pack based on the temperature and the humidity. At 320, the method 300 determines whether the requested coolant temperature is less than the dew point plus a predetermined offset. If true, the method 300 continues to 324. If false, the method 300 continues to 328.

At 324, the method 300 sets the coolant temperature (e.g., a desired coolant temperature) equal to the dew point plus the predetermined offset. At 328, the method 300 sets the desired coolant temperature equal to the requested coolant temperature. At 332, the method 300 controls a coolant system of the electric vehicle according to the desired coolant temperature. The method 300 ends at 336.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A battery control system for an electric vehicle including a battery pack, the battery control system comprising:
    a dew point calculation module that receives at least a first signal indicative of humidity within the battery pack and a second signal indicative of temperature within the battery pack, and that calculates a dew point within the battery pack based on the humidity and the temperature; and
    a coolant system control module that receives the dew point and a requested coolant temperature, that sets a desired coolant temperature based on the dew point and the requested coolant temperature, and that selectively operates a coolant system of the battery pack based on the desired coolant temperature;
    wherein the coolant system control module determines whether the requested coolant temperature is less than at least one of the dew point and a sum of the dew point and a predetermined offset, and sets the desired coolant temperature based on the determination.

2. The battery control system of claim 1, wherein the dew point calculation module receives the first signal from a humidity sensor located within the battery pack.

3. The battery control system of claim 2, wherein the dew point calculation module receives the second signal from at least one of the humidity sensor and a temperature sensor located within the battery pack.

4. The battery control system of claim 1, wherein the coolant system control module sets the desired coolant temperature based on the requested coolant temperature if the requested coolant temperature is greater than or equal to the at least one of the dew point and the sum.

5. The battery control system of claim 1, wherein the coolant system control module sets the desired coolant temperature based on the at least one of the dew point and the sum if the requested coolant temperature is less than the at least one of the dew point and the sum.

6. The battery system of claim 5, wherein:
    the requested coolant temperature is based upon battery temperature; and
    the coolant system control module sets the desired coolant temperature based on the at least one of the dew point and the sum if the requested coolant temperature is less than the at least one of the dew point and the sum and the battery temperature exceeds a high battery temperature threshold.

7. A method of operating a battery control system for an electric vehicle including a battery pack, the method comprising:
    receiving at least a first signal indicative of humidity within the battery pack and a second signal indicative of temperature within the battery pack;
    calculating a dew point within the battery pack based on the humidity and the temperature setting a desired coolant temperature based on the dew point and a requested coolant temperature;
    selectively operating a coolant system of the battery pack based on the desired coolant temperature;
    determining whether the requested coolant temperature is less than at least one of the dew point and a sum of the dew point and a predetermined offset; and
    setting the desired coolant temperature based on the determination.

8. The method of claim 7, wherein receiving the first signal includes receiving the first signal from a humidity sensor located within the battery pack.

9. The method of claim 8, wherein receiving the second signal includes receiving the second signal from at least one of the humidity sensor and a temperature sensor located within the battery pack.

10. The method of claim 7, further comprising setting the desired coolant temperature based on the requested coolant temperature if the requested coolant temperature is greater less than or equal to the at least one of the dew point and the sum.

11. The method of claim 7, wherein:
the requested coolant temperature is based upon battery temperature; and the coolant system control module sets the desired coolant temperature based on the at least one of the dew point and the sum if the requested coolant temperature is less than the at least one of the dew point and the sum and the battery temperature exceeds a high battery temperature threshold.

12. The method of claim 7, further comprising setting the desired coolant temperature based on the at least one of the dew point and the sum if the requested coolant temperature is less than the at least one of the dew point and the sum.

* * * * *